Oct. 4, 1932.   A. SONNTAG   1,881,332
GYRATIC TESTING INSTRUMENT
Filed Aug. 1, 1930   2 Sheets-Sheet 1
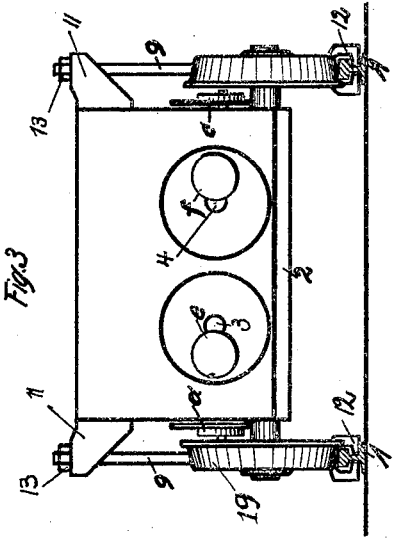
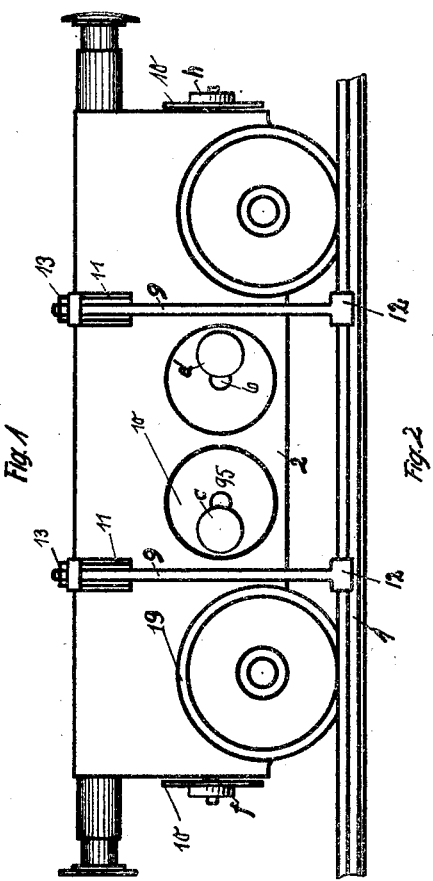
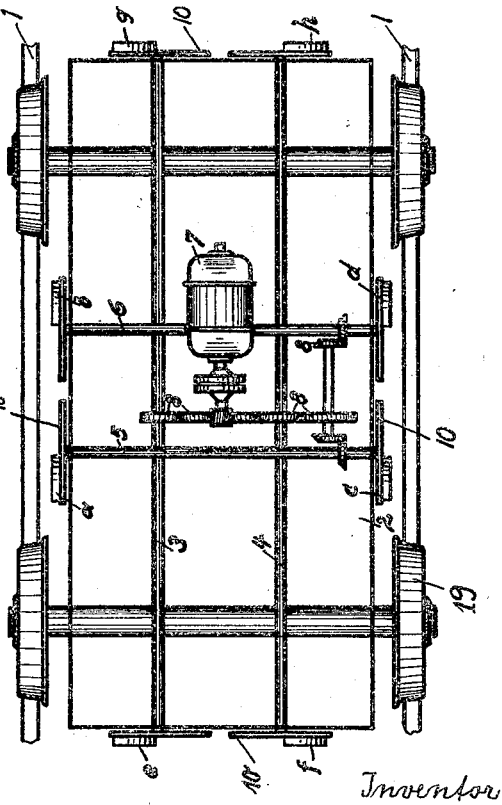
Inventor:
Alfred Sonntag Oct. 4, 1932.   A. SONNTAG   1,881,332
GYRATIC TESTING INSTRUMENT
Filed Aug. 1, 1930   2 Sheets-Sheet 2
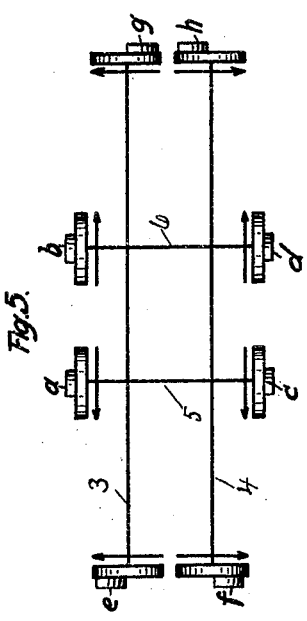
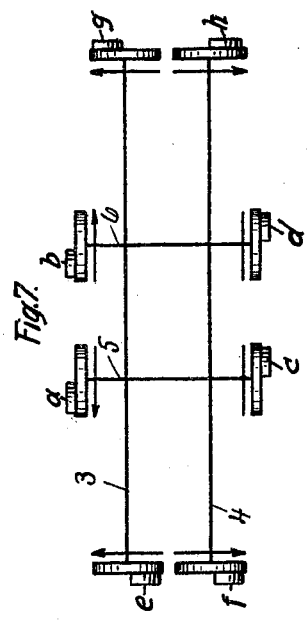
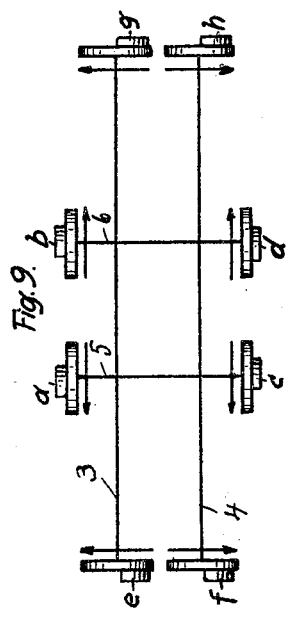
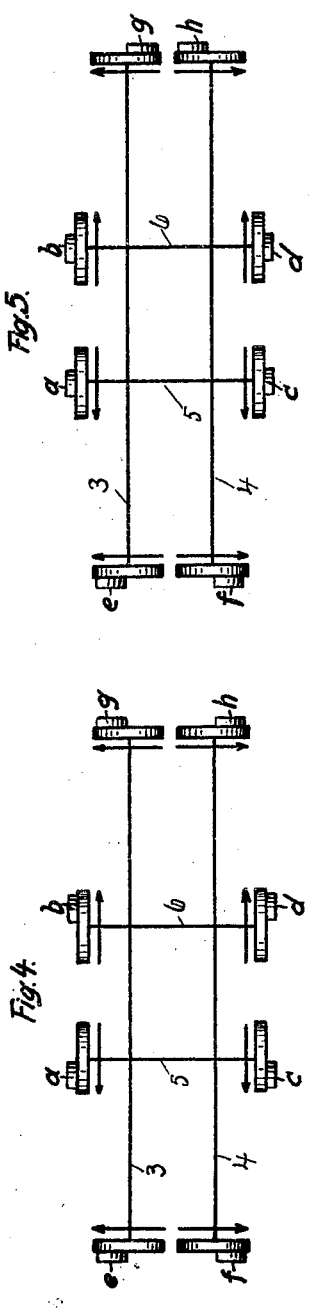
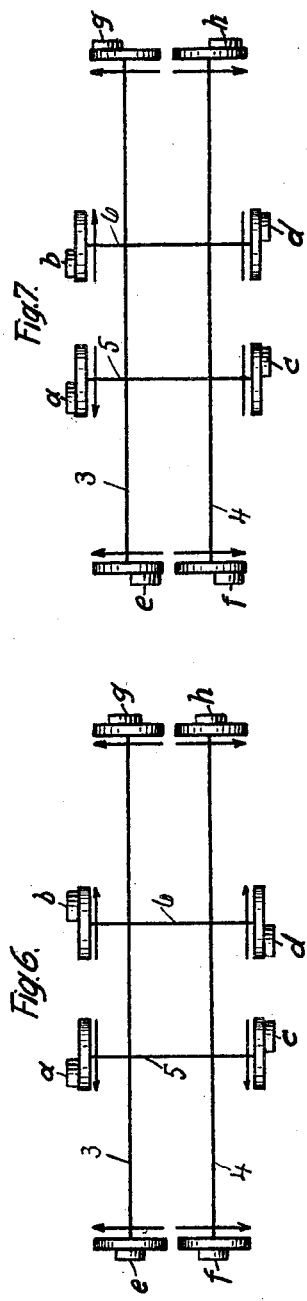
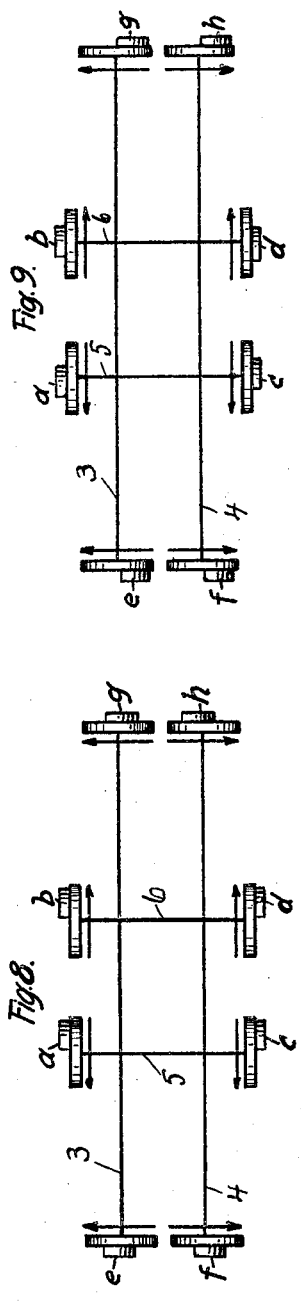
Inventor:
Alfred Sonntag
by Karl Michaelis
Atty.

Patented Oct. 4, 1932

1,881,332

UNITED STATES PATENT OFFICE

ALFRED SONNTAG, OF DUSSELDORF, GERMANY, ASSIGNOR TO LASENHAUSENWERKE, DUSSELDORFER MASCHINENBAU A. G., OF DUSSELDORF, GERMANY

GYRATIC TESTING INSTRUMENT

Application filed August 1, 1930, Serial No. 472,273, and in Germany August 5, 1929.

My invention relates to gyratic testing instruments of the type described in my copending application for patent of the United States, Serial No. 256,787, filed February 24, 1928. In this application I have described a method of and an apparatus for testing machinery and structures by applying thereto periodical impulses and by using the resulting oscillations as a basis for ascertaining the dynamic properties of the part under test. It is an object of my invention to increase the adaptability of an instrument of this type.

To this end I combine a plurality of gyrating weights which are so arranged that they generate not only periodical forces but also periodical momenta as in the method and apparatus described in my said copending application in three directions at right angles to each other, which are transmitted onto the part under test.

In the drawings affixed to this specification and forming part thereof an instrument embodying my invention and diagrams showing its operation are illustrated diagrammatically by way of example.

In the drawings

Fig. 1 is an elevation,

Fig. 2 is a plan view, and

Fig. 3 is an end elevation viewed from the left in Fig. 2 of the instrument,

Figs. 4 to 9 illustrate the application of the instrument to the testing of a bridge structure.

Referring to the drawings and first to Figs. 1 to 3, 2 is a car having four flanged wheels 19 for running on a track 1. 3, 4 and 5, 6 are pairs of shafts extending in parallel and at right angles, respectively, to the longitudinal and to the transverse axis of the car. The ends of the shafts project beyond the ends and sides of the car and are equipped with discs 10 at both ends. Weights $a$ and $c$ arranged on the discs 10, 10 at the ends of the shaft 5 can be displaced radially on the discs in both directions by any suitable means, which need not be described as they are old in the art. Similar weights are arranged in a similar manner at $b$ and $d$ for the shaft 6, at $e$ and $g$ for the shaft 3 and at $f$ and $h$ for the shaft 4.

Rotation is imparted to the shafts from an engine which is here shown as an electromotor 7, through suitable spur and bevel gearings 8, 8.

9, 9 are rods which are secured to the car by brackets 11, 11 at its sides and are provided with suitable clamping means 12, 12 at their lower ends for engaging the heads of the rails 1. Nuts 13 are seated on the threaded ends of the rods above the brackets 11 for holding the car down on the rails.

In Figs. 4 to 9 only the shafts 3, 4, 5 and 6 with the weights on their discs are shown. It has been assumed that the car is attached by its rods 9 to rails on a bridge (not shown), but obviously I am not limited to this particular case nor am I limited to a vehicle having flanged or other wheels as I may as well use a slide without wheels. The longitudinal axis of the bridge is supposed to extend in the same vertical plane as the longitudinal axis of the car 1. In all figures the direction of rotation of the shafts has been indicated by arrows near their weighted discs.

Referring now to Fig. 4 the instrument is here set for generating oscillations at right angles to the bridge axis. Vertical oscillations are generated by each pair of weights which gyrate in the same vertical plane but in opposite directions, for instance weights $a$ and $b$. As the weights gyrate in opposite directions the horizontal components of the centrifugal forces are permanently balanced. Four forces are generated which alternate in planes at right angles to the axis of the bridge.

Referring now to Fig. 5 the instrument is set for generating tilting oscillations in the direction of the bridge axis. The weights $a$, $b$, $c$ and $d$ are placed in the axes of their shafts, so that they are inactive while the other weights are placed eccentrically to their shafts and therefore are active. These latter weights generate vertical oscillations which are distorted for 180°, so that the tilting oscillations referred to are generated.

Referring now to Fig. 6, the weights $e$, $f$, $g$, $h$ are placed in the axes of their shafts and are inactive while the other weights are placed eccentrically and are active. These latter weights now generate oscillations at right angles to the axis of the bridge which are distorted for 180°.

Referring now to Fig. 7 the weights are so placed on their respective discs as to generate horizontal reciprocating forces. Vertical components are balanced within the instrument and torsional oscillations are generated in the plane of the bridge axis.

Referring now to Fig. 8 forces in the direction of the bridge axis are generated. A tilting moment results from the gyration of the weights $a$, $b$, $c$, $d$, but is balanced by a slight radial displacement of the other weights.

Referring to Fig. 9 the relative positions of the weights have been exchanged as compared with Fig. 8, so that oscillations at right angles to the bridge axis are generated. The tilting moment is here balanced by a slight displacement of the weights $a$, $b$, $c$, $d$.

I wish it to be understood that I do not desire to be limited to the exact details of construction shown and described for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

I claim:—

1. Gyratic testing instrument comprising a plurality of gyrating weights which are arranged to be adjusted so as to transmit onto the part under test periodical forces and momenta in three directions and at right angles to each other.

2. Gyratic testing instrument comprising a plurality of gyrating weights mounted to rotate partly in planes parallel to each other and partly in planes at right angles to each other, these weights being arranged to be adjusted so as to transmit onto the part under test periodical forces and momenta in three directions and at right angles to each other.

3. Gyratic testing instrument comprising a plurality of gyrating weights adapted to be displaced for various gyrating phases with respect to each other and arranged to be adjusted so as to transmit onto the part under test periodical forces and momenta in three directions and at right angles to each other.

4. Gyratic testing instrument comprising a plurality of gyrating weights which are arranged to be adjusted so as to transmit onto the part under test periodical forces and momenta in three directions and at right angles to each other and are adapted to be displaced radially to either side of their gyrating axes.

In testimony whereof I affix my signature.

ALFRED SONNTAG.